(12) United States Patent
Wadatkar et al.

(10) Patent No.: US 11,371,368 B2
(45) Date of Patent: Jun. 28, 2022

(54) SEALING ARRANGEMENT WITH PRESSURE-LOADED FEATHER SEALS TO SEAL GAP BETWEEN COMPONENTS OF GAS TURBINE ENGINE

(71) Applicant: Siemens Energy Global GmbH & Co. KG, Munich (DE)

(72) Inventors: Viraj Wadatkar, Charlotte, NC (US); Adam J. Weaver, Oviedo, FL (US); Robert H. Bartley, Oviedo, FL (US)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 16/982,866

(22) PCT Filed: Mar. 27, 2018

(86) PCT No.: PCT/US2018/024542
§ 371 (c)(1),
(2) Date: Sep. 21, 2020

(87) PCT Pub. No.: WO2019/190477
PCT Pub. Date: Oct. 3, 2019

(65) Prior Publication Data
US 2021/0054751 A1    Feb. 25, 2021

(51) Int. Cl.
*F01D 11/00*    (2006.01)
*F01D 9/02*    (2006.01)
(Continued)

(52) U.S. Cl.
CPC ............... *F01D 9/02* (2013.01); *F01D 11/00* (2013.01); *F01D 25/24* (2013.01); *F01D 25/30* (2013.01);
(Continued)

(58) Field of Classification Search
CPC . F01D 9/02; F01D 11/02; F01D 25/24; F01D 25/30; F02C 7/28; F05D 2220/32; F05D 2240/128; F05D 2240/55
See application file for complete search history.

(56) References Cited

U.S. PATENT DOCUMENTS 4,575,099 A * 3/1986 Nash .................... F16J 15/3204
277/345
4,645,217 A * 2/1987 Honeycutt, Jr ....... F01D 11/005
277/555

(Continued)

FOREIGN PATENT DOCUMENTS

EP    2592231 A2    5/2013

OTHER PUBLICATIONS

PCT International Search Report and Written Opinion of International Searching Authority dated Nov. 21, 2018 corresponding to PCT International Application No. PCT/US2018/024542 filed Mar. 27, 2018.

*Primary Examiner* — David E Sosnowski
*Assistant Examiner* — Theodore C Ribadeneyra (57) ABSTRACT

A sealing arrangement in a gas turbine engine to seal a gap between first and second turbine components is provided. The sealing arrangement includes a first arcuate feather seal connected to an anchoring assembly of the sealing arrangement affixed to the first turbine component. A second arcuate feather seal is affixed to the second turbine component. The first arcuate feather seal and the second arcuate feather seal are responsive to a pressure differential that develops across the gap to form a pressure-loaded sealing joint between respective sealing surfaces of the first arcuate feather seal and the second arcuate feather seal. The sealing arrangement provides substantial design flexibility since it can reliably provide appropriate sealing functionality while enabling multiple degrees of freedom, such as to accommodate radial (Continued)

and/or axial displacements that can develop between the first turbine component and the second turbine component.

18 Claims, 5 Drawing Sheets

(51) Int. Cl.
    *F01D 25/24* (2006.01)
    *F01D 25/30* (2006.01)
    *F02C 7/28* (2006.01)

(52) U.S. Cl.
    CPC ............ *F02C 7/28* (2013.01); *F05D 2220/32* (2013.01); *F05D 2240/128* (2013.01); *F05D 2240/55* (2013.01)

(56) References Cited

U.S. PATENT DOCUMENTS

| | | | | |
|---|---|---|---|---|
| 5,143,292 | A * | 9/1992 | Corsmeier | F02K 1/12 239/127.3 |
| 5,797,723 | A * | 8/1998 | Frost | F16J 15/0887 415/174.2 |
| 6,464,232 | B1 * | 10/2002 | Marchi | F01D 11/005 277/630 |
| 6,464,457 | B1 | 10/2002 | Morgan et al. | |
| 7,784,264 | B2 | 8/2010 | Weaver et al. | |
| 8,118,549 | B2 | 2/2012 | Schiavo | |
| 8,459,041 | B2 * | 6/2013 | Flanagan | F01D 9/023 60/796 |
| 9,828,868 | B2 * | 11/2017 | Guinn | F02C 7/28 |
| 9,845,733 | B2 | 12/2017 | Brice | |
| 9,879,555 | B2 | 1/2018 | Moehrle et al. | |
| 10,400,616 | B2 * | 9/2019 | Tuertscher | F01D 5/189 |
| 10,738,656 | B2 * | 8/2020 | Boeck | F01D 11/003 |
| 10,895,163 | B2 * | 1/2021 | Schiavo | F01D 9/041 |
| 2002/0163134 | A1 * | 11/2002 | Cromer | F16J 15/3288 277/411 |
| 2006/0127219 | A1 | 6/2006 | Zborovsky | |
| 2011/0274534 | A1 * | 11/2011 | Hayton | F01D 25/26 415/110 |
| 2012/0200046 | A1 | 8/2012 | Green et al. | |
| 2012/0306166 | A1 * | 12/2012 | Melton | F01D 9/023 277/637 |
| 2013/0111912 | A1 * | 5/2013 | Flanagan | F01D 9/023 60/752 |
| 2016/0326897 | A1 | 11/2016 | Feldmann et al. | |

* cited by examiner

SEALING ARRANGEMENT WITH PRESSURE-LOADED FEATHER SEALS TO SEAL GAP BETWEEN COMPONENTS OF GAS TURBINE ENGINE

BACKGROUND

1. Field

Disclosed embodiments are generally related to turbomachinery, such as gas turbine engines and, more particularly, to a sealing arrangement in a gas turbine engine, including pressure-loaded feather seals to seal a gap between a first turbine component, such as a transition duct exit, and a second turbine component, such as a first stage turbine vane structure.

2. Description of the Related Art

In turbomachinery, such as a gas turbine engine, a number of combustion chambers combust fuel mixed with compressed air, and a hot working gas flowing from these combustion chambers is passed via respective transitions (also referred to by some in the art as ducts and tail tubes) to respective entrances of a turbine stage of the engine. More specifically, a plurality of combustion chambers may be arranged radially about a longitudinal axis of the gas turbine engine, and likewise radially arranged transitions comprise outlet ends that converge to form an annular inflow of working gas to the turbine stage entrance. Each transition exit is joined by a number of seals each of which bridges a gap between a portion of the exit and one or more turbine components, such as turbine vane carrier. A number of factors—such as adjacent component growth, variances due to thermal expansion, mechanical loads, vibrational forces from combustion dynamics, etc.—can present challenges regarding durability and performance of such seals.

Disclosed embodiments offer an improved technical solution for a sealing arrangement in a gas turbine engine. See U.S. Pat. Nos. 7,784,264 and 8,118,549 for examples of transition ducts for a gas turbine involving seal apparatuses.

BRIEF DESCRIPTION

One disclosed embodiment is directed to a sealing arrangement to seal a gap between a first turbine component and a second turbine component in a gas turbine engine. The sealing arrangement includes a first arcuate feather seal connected to an anchoring assembly of the sealing arrangement affixed to the first turbine component. A second arcuate feather seal is affixed to the second turbine component. The first feather seal and the second feather seal are responsive to a pressure differential that develops across the gap to form a pressure-loaded sealing joint between respective sealing surfaces of the first arcuate feather seal and the second arcuate feather seal.

Disclosed sealing arrangements provide substantial design flexibility since such sealing arrangements can reliably provide appropriate sealing functionality under various thermo-mechanical load scenarios that can routinely develop during operation of the gas turbine engine while enabling multiple degrees of freedom effective to accommodate radial and/or axial displacements that can develop between the first turbine component and the second turbine component and maintain such sealing joint.

DETAILED DESCRIPTION

The inventors of the present invention have recognized some practical limitations regarding certain known sealing designs that have been used to seal a gap between components in a gas turbine engine. Often, such known sealing designs may involve relatively thick (i.e., relatively stiff), metal strip seal segments, where at least some of the seal segments may overlap over one another to close the gap, and, in theory, should smoothly slide over one another to, for example, accommodate relative motion between the turbine components. However, in actual operation in the hot-temperature, high-vibration of the gas turbine engine, there may be substantial misalignments that can develop between the various seal segments, which may then interfere with one another, and may eventually bind causing premature wear of the sealing surfaces. This misalignment may be caused by various reasons, such as assembly tolerances, relative thermal growth, and deformation under thermo-mechanical loads and/or vibration. Regardless of the specific reason for the misalignment, it will be appreciated that such known seal designs tend to suffer from high rates of leakage under such misalignment conditions.

In view of such recognition, the present inventors propose an innovative technical solution for a sealing arrangement. Disclosed embodiments, in a cost-effective and reliable manner, make use of feather seals responsive to a pressure differential that develops across the gap to form a pressure-loaded sealing joint having multiple degrees of freedom, such as can effectively accommodate axial and radial (e.g., saw-toothing) relative motion between adjacent row one vane segments in a gas turbine.

Disclosed feather seals may involve a multi-ply construction (comprising relatively thin metal plies that, without limitation, may range in thickness from approximately 0.3 mm to approximately 1.0 mm to achieve appropriate flexibility) to form the pressure-loaded sealing joint. These thin plies can be joined in a straightforward manner to form a relatively flexible sealing arrangement effective to reduce leakage rates by ensuring a substantially uniform sealing surface contact under various thermo-mechanical load scenarios. The joining of these thin plies may be performed by way of suitable joints, such as, without limitation, bonding joints, welding joints, brazing joints, etc.

Disclosed embodiments are conducive to manufacturing-friendly and time-efficient operations that substantially improve manufacturability, dimensional accuracy and repeatability, and reduce costs. Without limitation, disclosed embodiments are effective to provide low-levels of stress under temperature gradients experienced during operation of the gas turbine engine. Accordingly, disclosed embodiments are expected to show an improved life relative to known seal designs, thereby reducing the requirement of replacement over the life of the gas turbine. This should reduce the cost of maintenance, and economic losses that otherwise would be endured due to down-time of the gas turbine engine. Disclosed embodiments providing longer life should in turn incrementally reduce the operating cost of the gas turbine over its entire life-cycle.

In the following detailed description, various specific details are set forth in order to provide a thorough understanding of such embodiments. However, those skilled in the art will understand that disclosed embodiments may be practiced without these specific details that the aspects of the present invention are not limited to the disclosed embodiments, and that aspects of the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent, unless otherwise indicated. Moreover, repeated usage of the phrase "in one embodiment" does not necessarily refer to the same embodiment, although it may. It is noted that disclosed embodiments need not be construed as mutually exclusive embodiments, since aspects of such disclosed embodiments may be appropriately combined by one skilled in the art depending on the needs of a given application.

The terms "comprising", "including", "having", and the like, as used in the present application, are intended to be synonymous unless otherwise indicated. Lastly, as used herein, the phrases "configured to" or "arranged to" embrace the concept that the feature preceding the phrases "configured to" or "arranged to" is intentionally and specifically designed or made to act or function in a specific way and should not be construed to mean that the feature just has a capability or suitability to act or function in the specified way, unless so indicated.

Several non-limiting terms may be used throughout this disclosure to facilitate explaining structural and/or functional interrelationships between components within the turbine engine, and thus it may helpful to define this terminology to establish a common understanding. Accordingly, these terms and their definitions, unless stated otherwise, are as follows. The terms "forward" and "aft" or "aftward" or similar, without further specificity, refer to the direction toward directions relative to the orientation of the gas turbine. Accordingly, "forward" refers to the compressor end of the engine, while "aftward" refers to the direction toward the turbine end of the engine. Each of these terms, thus, may be used to indicate movement or relative position along a longitudinal central axis of the machine or a component therein. The terms "downstream" and "upstream" are used to indicate position, such as within a given conduit relative to the general direction of a flow moving through it. As will be appreciated, these terms reference a direction relative to the direction of flow expected through the given conduit during normal operation, which should be plainly apparent to those skilled in the art. As such, the term "downstream" refers to the direction in which the fluid is flowing through the given conduit, while "upstream" refers to the opposite of that. Thus, for example, the primary flow of working fluid through a gas turbine, which begins as an air flow moving through the compressor and then becomes a flow of combustion gases within the combustor and beyond, may be described as beginning at an upstream location, at an upstream or forward end of the compressor and flowing downstream eventually toward a location at a downstream or aftward end of the turbine.

Additionally, the term "radial" refers to a movement or position perpendicular to an axis. For example, in certain situations it may be desirable to describe relative distance from a central axis, for example. In this case, for example, if a first component resides closer to the central axis than a second component, the first component will be described as being either "radially inward" or "inboard" of the second component. If, on the other hand, the first component resides further from the central axis than the second component, the first component will be described herein as being either "radially outward" or "outboard" of the second component. Additionally, as will be appreciated, the term "axial" refers to movement or position parallel to an axis, and the term "circumferential" refers to movement or position around an axis. While these terms may be applied in relation to a common central axis that may extend through the compressor and turbine sections of the engine, it should be appreciated that these terms may also be used in relation to other components or sub-systems of the engine as may be appropriate.

Figure 1:
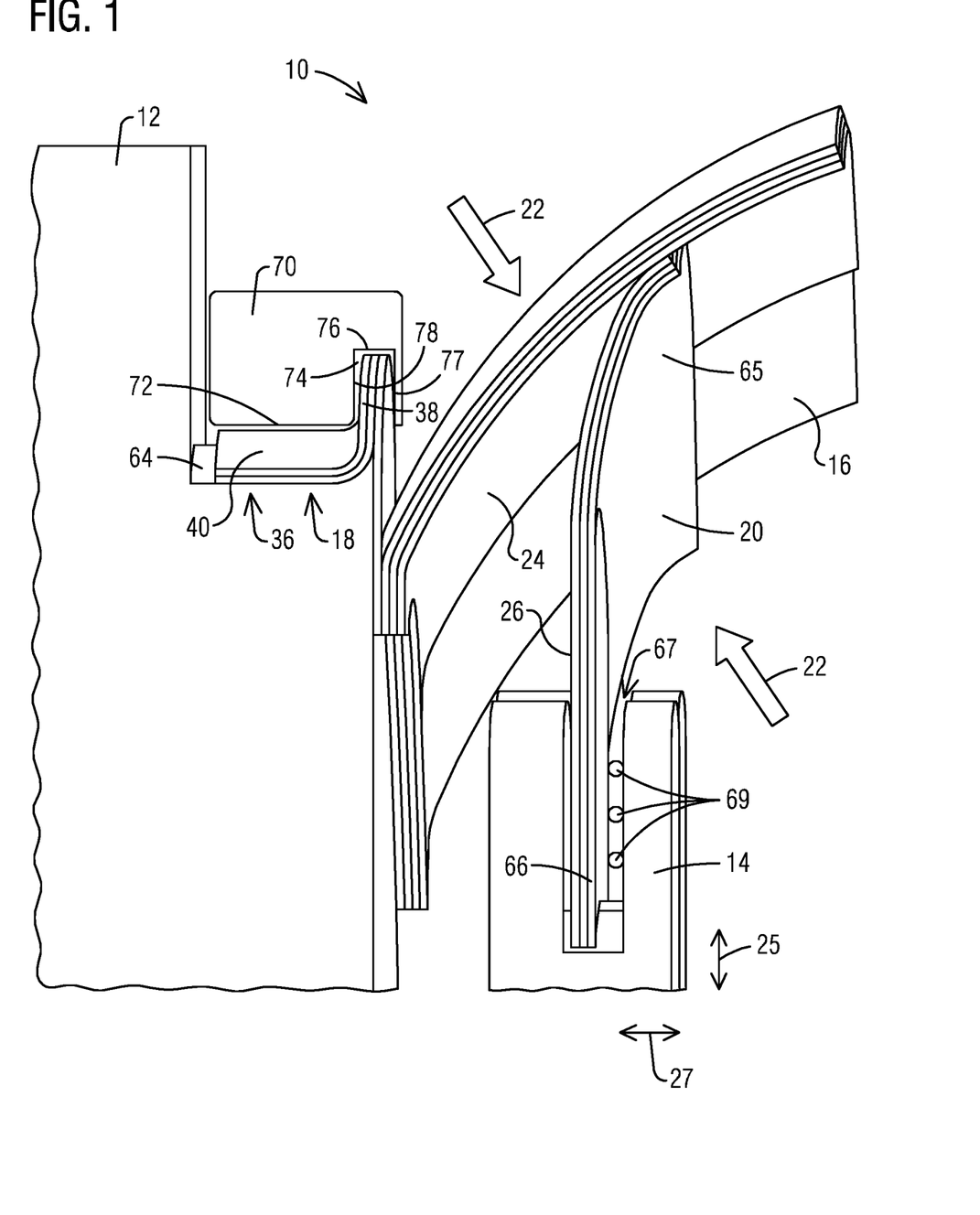
FIG. 1 is a fragmentary, isometric view of a disclosed sealing arrangement in a gas turbine engine, as may be used to seal a gap between a first turbine component, such as transition duct exit, and a second turbine component, such as a first stage turbine vane structure.

FIG. 1 is a fragmentary, isometric view of a disclosed sealing arrangement 10 to seal a gap between a first turbine component 12, such as a transition duct exit, and a second turbine component 14, such as a first stage turbine vane structure, in a gas turbine engine. A first arcuate feather seal 16 may be connected to an anchoring assembly 18 of the sealing arrangement affixed to first turbine component 12. As will be appreciated from disclosure set forth below, anchoring assembly 18 may be take any one of various alternative design configurations depending on the needs of a given application.

A second arcuate feather seal 20 is affixed to second turbine component 14. Without limitation, first feather seal 16 and second feather seal 20 are responsive to a pressure differential (schematically represented by arrows 22) that develops across the gap to form a pressure-loaded sealing joint between respective sealing surfaces 24, 26 of first arcuate feather seal 16 and second arcuate feather seal 20. That is, the pressure differential urges sealing surfaces 24, 26 to contactively engage one another to form the pressure-loaded sealing joint and maintain such sealing joint under various thermo-mechanical load scenarios that can routinely develop during operation of the gas turbine engine.

The pressure-loaded sealing joint, which is formed between respective sealing surfaces 24, 26 may comprise, without limitation, a radially slidable pressure-loaded sealing joint (e.g., sweeping relative motion) between sealing surfaces 24, 26) to accommodate radial displacements (schematically represented by twin-headed arrow 25) between first turbine component 12 and second turbine component 14. The pressure-loaded sealing joint may additionally comprise an axially compliant pressure-loaded sealing joint to accommodate axial displacements (schematically represented by twin-headed arrow 27) between first turbine component 12 and second turbine component 14. This feature is effective to accommodate saw-toothing relative motion that commonly develops between adjacent row one vane segments in the gas turbine engine.

Figure 2:
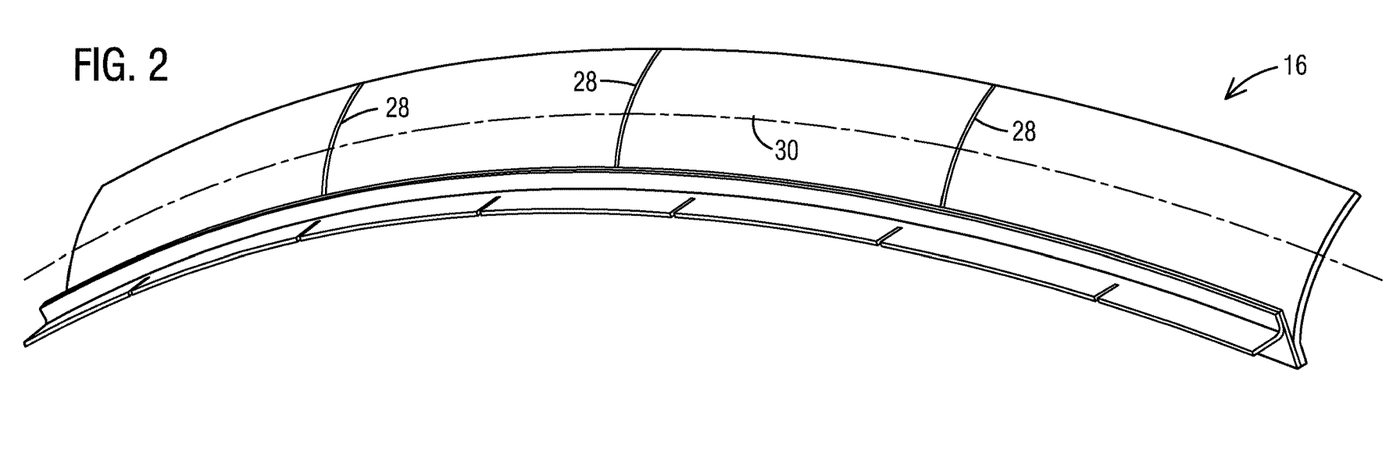
FIGS. 2 and 3 are respective isometric views of non-limiting embodiments of a first arcuate feather seal and a second arcuate feather seal, as may be used in a disclosed sealing arrangement.
Figure 3:
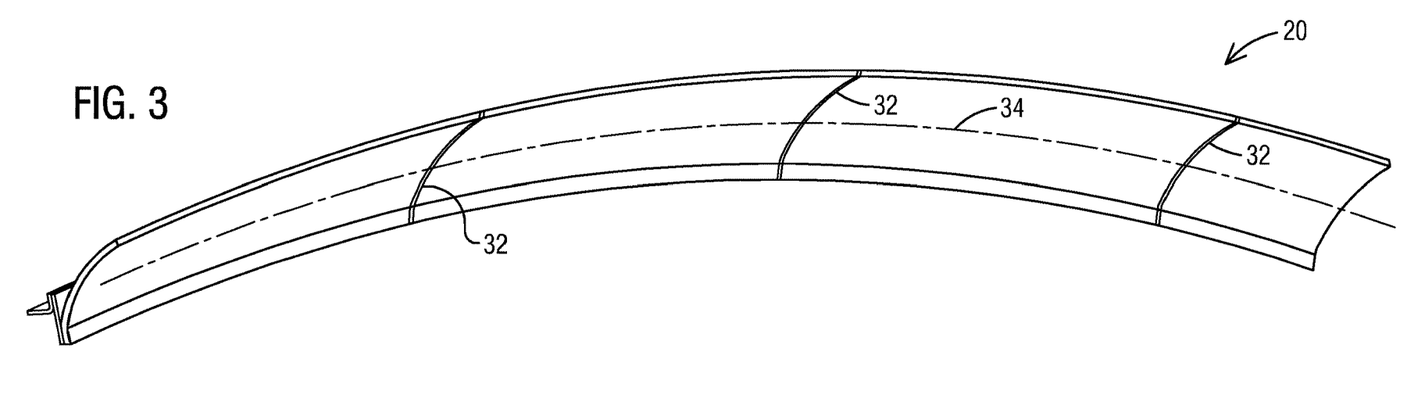

As may be appreciated in FIGS. 2 and 3, in one non-limiting embodiment, first arcuate feather seal 16 may include a plurality of spaced apart slits 28 positioned perpendicular to a longitudinal axis 30 of first arcuate feather seal 16. Similarly, second arcuate feather seal 20 may include a plurality of spaced apart slits 32 positioned perpendicular to a longitudinal axis 34 of second arcuate feather seal 20. These features are conducive to improving flexibility of disclosed seal arrangements to better accommodate relative axial and radial motion between the components.

Figure 4:
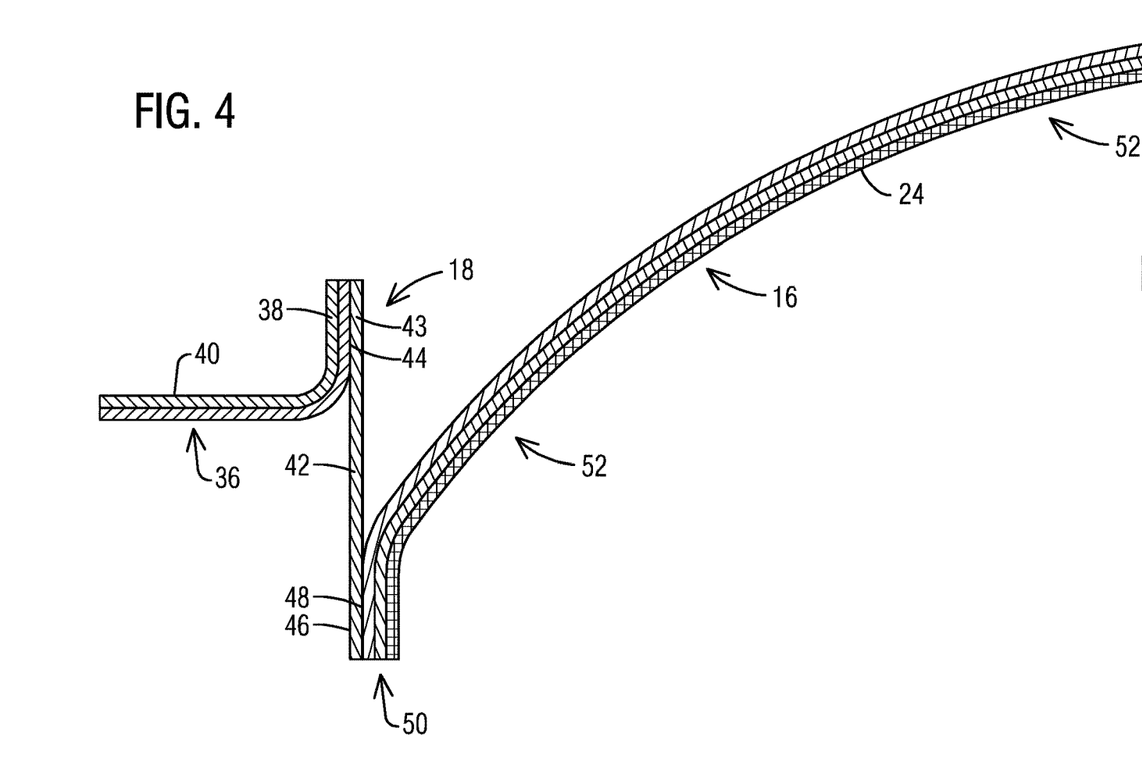
FIG. 4 is a cross-sectional view of a first arcuate feather seal including an anchoring assembly.
Figure 5:
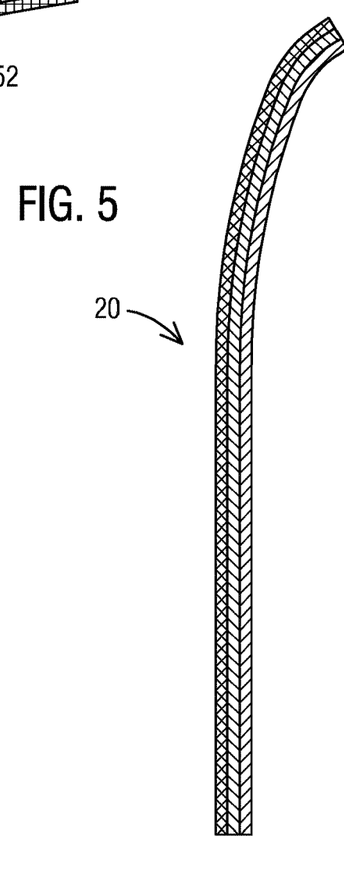
FIG. 5 is a cross-sectional view of the second arcuate feather seal.

As may be appreciated in FIGS. 4 and 5, arcuate feather seals 16, 20 comprise respective multi-ply assemblies joined to form a relatively flexible sealing arrangement effective to reduce leakage rates by ensuring a substantially uniform sealing surface contact under various thermo-mechanical load scenarios. As may be further appreciated in FIG. 4, in one non-limiting embodiment, anchoring assembly 18 may include an anchor member 36 including a radially-extending section 38 configured to turn into an axially-extending flange section 40. Anchoring assembly 18 may further include a support member 42 having a radially outer segment 43 having a forward surface 44 affixed to a corresponding surface of radially-extending section 38 of anchor member 36. Support member 42 further includes a radially inner segment 46 having an aft surface 48 affixed to a corresponding surface of an anchored end segment 50 of first arcuate feather seal 16.

In one non-limiting embodiment, the respective sealing surface 24 of first arcuate feather seal 16 is disposed at a free segment 52 of first arcuate feather seal 16. Free segment 52 extends away from anchored end segment 50 of first arcuate feather seal 16. In one non-limiting embodiment, a respective ply of the respective multi-ply assemblies that respectively defines the sealing surfaces 24, 26 may comprise a cloth metal ply.

As may be appreciated in FIG. 1, in one non-limiting embodiment, axially-extending flange section 40 of anchor member 36 may be disposed on a circumferentially-extending step 64 constructed at the transition duct exit. In one non-limiting embodiment, the respective sealing surface 26 of second arcuate feather seal 20 may be disposed at a free end segment 65 of second arcuate feather seal 20. Free end segment 65 is disposed opposite an anchored end segment 66 of second arcuate feather seal 20. Free end segment 65 of second arcuate feather seal 20 is disposed radially outward relative to anchored end segment 66 of the second arcuate feather seal. Anchored end segment 66 of second arcuate feather seal 20 may be disposed in a circumferentially-extending groove 67 constructed at first stage turbine vane structure 14. Without limitation, anchored end segment 66 of second arcuate feather seal 20 may be retained by an interference fit (schematically represented by dimples 69) or other suitable affixing members, such as affixing pins, etc.

In certain applications, as seen in FIG. 1, one may optionally use a retainer block 70 to retain anchor assembly 18 in step 64 at the transition duct exit. Retainer block 70 may include a base segment 72 positioned against axially-extending flange section 40 of anchor member 36 to radially retain axially-extending flange section 40. Retainer block 70 may further include a radially extending slot 74 including a radial end 76 positioned to radially retain radially-extending section 38 of anchor member 36, and further including a forward surface 77 and an aft surface 78 to axially retain radially-extending section 38 of anchor member 36.

Figure 6:
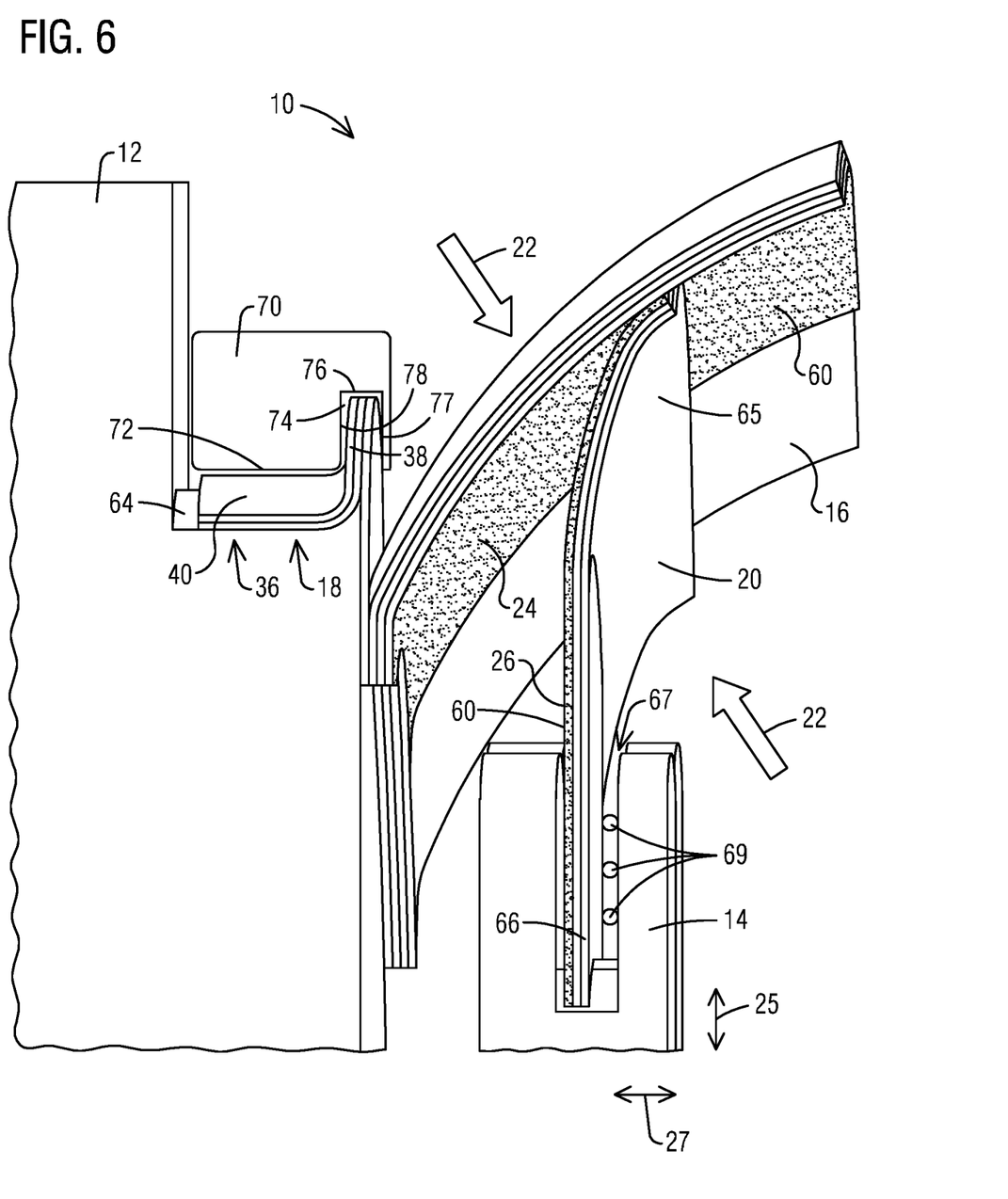
FIG. 6 is a fragmentary, isometric view of another disclosed sealing arrangement, as may include abrasion-resistant features in respective mutually contacting sealing surfaces of the first arcuate feather seal and the second arcuate feather seal.

As may be appreciated in FIG. 6, in one non-limiting embodiment, a ply of the respective multi-ply assemblies that defines the sealing surfaces 24, 26 may comprise a ply coated with a high-temperature abrasion-resistant coating 60, such as, without limitation, a cobalt-based coating, a carbide-based coating or a tungsten-based coating. It will be appreciated that each of the plies that make up first feather seal 16 and second feather seal 20 may each be respectively coated with high-temperature abrasion-resistant coating 60.

Figure 7:
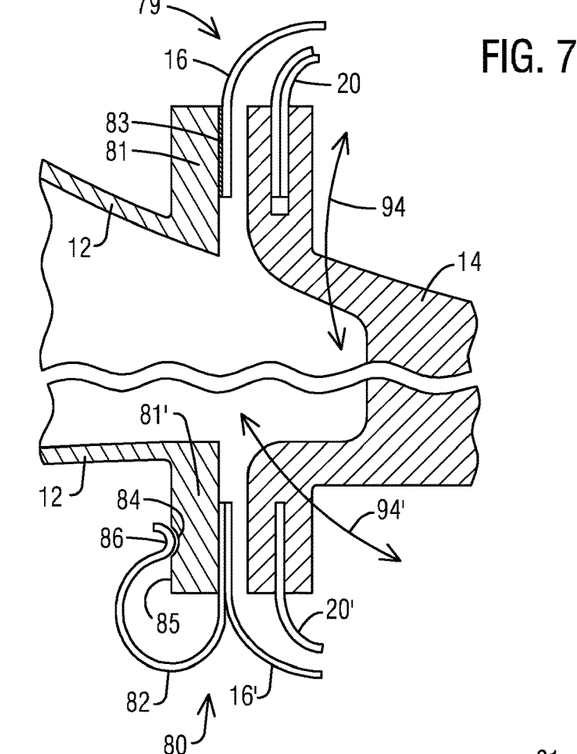
FIG. 7 is fragmentary, cross-sectional view of an alternative embodiment for affixing a disclosed sealing arrangement to a transition duct exit.

FIG. 7 is fragmentary, cross-sectional view of an alternative embodiment for affixing a disclosed sealing arrangement to transition duct exit 12. One skilled in the art will appreciate that this an alternative embodiment of anchoring assembly 18. Without limitation, at an outer diameter 79, first arcuate feather seal 16 may be joined to a circumferentially-extending lip 81 of transition end exit 12 by way of a weld joint 83. Without limitation, at an inner diameter 80, first arcuate feather seal 16' may be joined to a lip 81' of transition end exit 12 by way of a circumferentially-extending connecting hook 82. One may optionally construct a circumferentially-extending retainer groove 84 in a forward surface 85 of lip 81' configured to receive a corresponding segment 86 of circumferentially-extending connecting hook 82.

Figure 8:
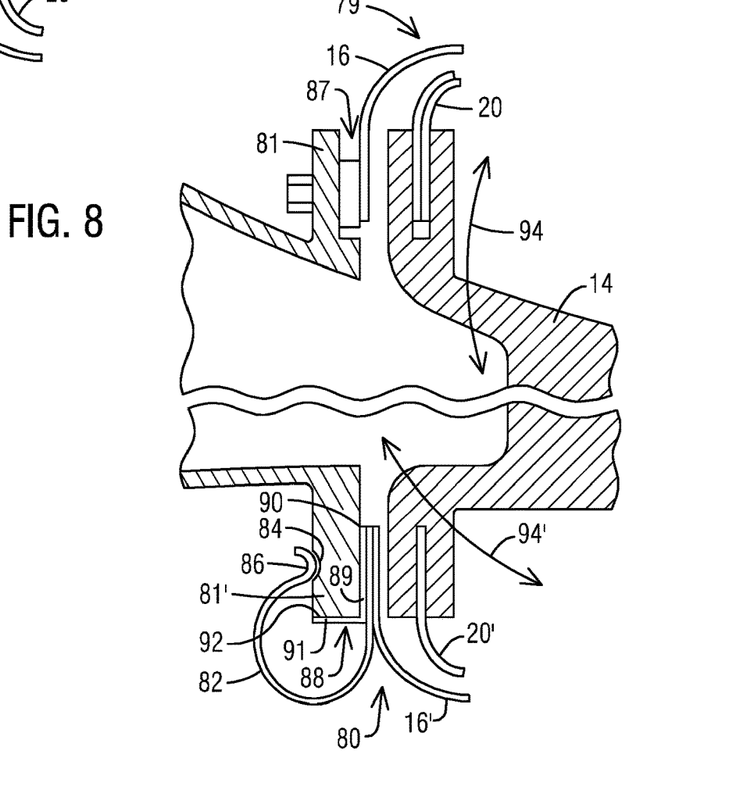
FIG. 8 is fragmentary, cross-sectional view of another alternative embodiment for affixing a disclosed sealing arrangement to a transition duct exit.

FIG. 8 is fragmentary, cross-sectional view of another alternative embodiment for affixing a disclosed sealing arrangement to transition duct exit. Without limitation, at outer diameter 79, first arcuate feather seal 16 may be joined to lip 81 of transition end exit 12 by way of a bolted joint 87. Without limitation, at inner diameter 80, first arcuate feather seal 16' may be joined to lip 81' of transition end exit 12 by way of circumferentially-extending connecting hook. One may optionally dispose a circumferentially-extending L-shaped reinforcer 88 including a radially-extending section 89 disposed against an aft surface 90 of lip 81' of transition end exit 12. L-shaped reinforcer 88 may further include an axially-extending section 91 disposed against a radially-inner surface 92 of lip 81'. In FIGS. 7 and 8, arrows 94 and 94' are intended to provide a conceptual visualization of the complex motion (e.g., involving radial and axial motion components) that can be developed at the respective outer and inner diameters of disclosed sealing arrangements.

In operation, disclosed embodiments in a cost-effective and reliable manner, make use of feather seals responsive to a pressure differential that develops across the gap to form a reliable pressure-loaded sealing joint having multiple degrees of freedom, such as can effectively accommodate axial and radial (e.g., saw-toothing) relative motion between adjacent row one vane segments in a gas turbine. Disclosed embodiments are effective to provide low-levels of stress under temperature gradients experienced during operation of the gas turbine engine. Disclosed embodiments are user-friendly for installation during original deployment; or removal and subsequent installation during servicing operations, such as by uncomplicated sliding in or out of the respective turbine components. For example, no need to remove transition ducts during such operations.

While embodiments of the present disclosure have been disclosed in exemplary forms, it will be apparent to those skilled in the art that many modifications, additions, and deletions can be made therein without departing from the scope of the invention and its equivalents, as set forth in the following claims.

What is claimed is:

1. A sealing arrangement to seal a gap between a first turbine component and a second turbine component in a gas turbine engine, the sealing arrangement comprising:
   a first arcuate feather seal connected to an anchoring assembly of the sealing arrangement affixed to the first turbine component; and
   a second arcuate feather seal affixed to the second turbine component,
   wherein the first arcuate feather seal comprises an anchored end segment and a free end segment disposed opposite the anchored end segment, wherein the anchored end segment of the first arcuate feather seal is in contact with and affixed to the first turbine component,
   wherein the second arcuate feather seal comprises an anchored end segment and a free end segment disposed opposite the anchored end segment, wherein the free end segment of the second arcuate feather seal is disposed radially outward relative to the anchored end segment of the second arcuate feather seal, wherein the anchored end segment of the second arcuate feather seal is in contact with and affixed to the second turbine component,
   wherein the first arcuate feather seal comprises a respective sealing surface disposed at the free end segment of the first arcuate feather seal,
   wherein the second arcuate feather seal comprises a respective sealing surface disposed at the free end segment of the second arcuate feather seal,
   wherein the sealing arrangement comprises a pressure-loaded sealing joint between the respective sealing surfaces of the first arcuate feather seal and the second arcuate feather seal, and
   wherein the pressure-loaded sealing joint is formed by a pressure differential that develops across the gap to contactively engage the first arcuate feather seal and the second arcuate feather seal.

2. The sealing arrangement of claim 1, wherein the pressure-loaded sealing joint comprises a radially slidable pressure-loaded sealing joint between the respective sealing surfaces of the first arcuate feather seal and the second arcuate feather seal to accommodate radial displacements between the first turbine component and the second turbine component, and wherein the pressure-loaded sealing joint comprises an axially compliant pressure-loaded sealing joint to accommodate axial displacements between the first turbine component and the second turbine component.

3. The sealing arrangement of claim 1, wherein the anchoring assembly comprises an anchor member comprising a radially-extending section configured to turn into an axially-extending flange section.

4. The sealing arrangement of claim 3, wherein the anchoring assembly further comprises a support member having a radially outer segment having an aft surface affixed to the radially-extending section of the anchor member, the support member further having a radially inner segment having a forward surface affixed to the anchored end segment of the first arcuate feather seal.

5. The sealing arrangement of claim 3, comprising a retainer block comprising a base segment positioned against the axially-extending flange section of the anchor member to radially retain the axially-extending flange section of the anchor member, and a radially extending slot including a radial end positioned to radially retain the radially-extending section of the anchor member, and further including an aft surface and a forward surface to axially retain the radially-extending section of the anchor member.

6. The sealing arrangement of claim 1, wherein the first arcuate feather seal and the second arcuate feather seal comprise respective multi-ply assemblies.

7. The sealing arrangement of claim 6, wherein a ply of the respective multi-ply assemblies comprises a cloth metal ply.

8. The sealing arrangement of claim 6, wherein a ply of the respective multi-ply assemblies comprises a ply coated with a high-temperature abrasion-resistant coating.

9. The sealing arrangement of claim 8, wherein the high-temperature abrasion-resistant coating is selected from the group consisting of a cobalt-based coating, a carbide-based coating and a tungsten-based coating.

10. The sealing arrangement of claim 1, wherein the first arcuate feather seal comprises a plurality of spaced apart slits positioned perpendicular to a longitudinal axis of the first arcuate feather seal.

11. The sealing arrangement of claim 1, wherein the second arcuate feather seal comprises a plurality of spaced apart slits positioned perpendicular to a longitudinal axis of the second arcuate feather seal.

12. The sealing arrangement of claim 1, wherein the first turbine component comprises a transition duct exit and the second turbine component comprises a first stage turbine vane structure.

13. The sealing arrangement of claim 12, wherein the axially-extending flange section of the anchor member is disposed on a circumferentially-extending step (64) constructed at the transition duct exit.

14. The sealing arrangement of claim 12, wherein the anchored end segment of the second arcuate feather seal is disposed in a circumferentially-extending groove constructed at the first stage turbine vane structure.

15. The sealing arrangement of claim 12, wherein at an outer diameter of the transition duct exit a respective first arcuate feather seal is joined to a circumferentially-extending lip of the transition duct exit by way of a joint selected from the group consisting of a weld joint, and a bolted joint.

16. The sealing arrangement of claim 12, wherein at an inner diameter of the transition duct exit a respective first arcuate feather seal is joined to a circumferentially-extending lip of the transition duct exit by way of a circumferentially-extending connecting hook.

17. The sealing arrangement of claim 16, wherein at the inner diameter of the transition duct exit further comprising a circumferentially-extending retainer groove in a forward surface of the circumferentially-extending lip at the inner diameter of the transition duct exit.

18. The sealing arrangement of claim 16, wherein at the inner diameter of the transition duct exit further comprising a circumferentially-extending L-shaped reinforcer including a radially-extending section disposed against an aft surface of the circumferentially-extending lip of the transition duct exit, the circumferentially-extending L-shaped reinforcer further including an axially-extending section disposed against a radially-inner surface of the circumferentially-extending lip of the transition duct exit.

* * * * *